3,226,358
ULTRAVIOLET LIGHT-ABSORBING EPOXY RESINS AND CONTAINERS COATED THEREWITH

Robert M. Smith and Frederick C. Haigh, Toledo, Ohio, assignors to Owens-Illinois, Inc., a corporation of Ohio
No Drawing. Filed Nov. 10, 1960, Ser. No. 68,363
5 Claims. (Cl. 260—45.95)

This invention relates to ultraviolet light-absorbing resins. In another aspect, the invention relates to containers coated with such resins. In a particular aspect, this invention relates to the reaction product of an epoxy resin, an amine curing agent, and certain substituted hydroxybenzophenones. The cured resins are especially useful as coatings for various materials, particularly for containers such as glass containers.

In recent years, a number of substituted orthohydroxybenzophenones have been found to be useful ultraviolet light-absorbers. Many of these have been suggested for use in stabilizing certain plastics such as polyacrylates, alkyd resins and the hydrocarbon resins such as polyethylene.

We have now found, however, that if such hydroxybenzophenone ultraviolet light-absorbing compounds are incorporated in an epoxy resin together with an amine curing agent, and the epoxy resin is allowed to react with the curing agent, there is produced a cured ultraviolet light-absorbing resin which has a pronouncedly higher absorption for the ultraviolet and near ultraviolet rays than would be expected from the absorption characteristics of the benzophenone compound alone or in other resins.

It is, therefore, an object of the invention to produce new ultraviolet light-absorbing amine-cured epoxy resins.

It is another object of the invention to coat materials with such ultraviolet light-absorbing resins in order to protect said materials from the effects of ultraviolet light. It is a further object of the invention to coat containers with such resins in order to protect the contents from the effects of ultraviolet light.

The new cured resins of the invention are made by mixing an epoxy resin, an amine curing agent for the epoxy resin and a substituted hydroxybenzophenone having the following general formula:

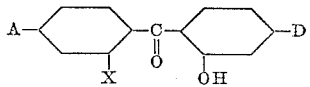

where
A is H, —OH, or —OR
X is H or —OH and
D is —OH or —OR where R is an alkyl group having from one to eight carbon atoms. In most cases R is methyl because of the more general availability of such compounds.

Known epoxy resins can be employed in the process of the invention. Commerically available epoxy resins include Epon 562, 828, 834, 864, 1001, 1007, and 1009, Epi-Rex 520, 540 and 550. "Epon" is the trademark of Shell Chemical Corporation.

One type of these commercially-available epoxy resins has the general structure as follows:

Thus, Epon 834 is of this type, as well as the other Epon resins mentioned, and these differ mainly in their degree of polymerization or molecular weight. Some of the materials are liquid, while others are solids. Epon 1001, for instance, has a melting point, Durrans Mercury Method, of 65–75° C. while Epon 834, for example, is a liquid epoxy resin having a viscosity of 4.1 to 9.7 poise at 25° C. and an epoxide equivalent of 230–280. These resins are normally made by condensing epichlorohydrin with diphenols such as bisphenol A.

As is well known, the amine curing agents for epoxy resins are primary and secondary amines and include the polyamines. Generally, in actual practice, polyamines or other fairly high molecular weight amines are employed because of their low volatility. Examples of applicable amines include triethylene tetramine, diethylene triamine, imino bis propylamine, N-methyl-N-bis-(3-aminopropyl) amine, tetraethylene pentamine, 3-(diethylamino) propylamine, 3-(dibutylamino) propylamine, meta phenylenediamine, and the like.

The cured ultraviolet light-absorbent resins are made by simply mixing the epoxy resin, the amine curing agent, and the benzophenone compound, and allowing the reaction to take place. In most cases, the reaction will initiate at room temperature and will be exothermic. If desired, the temperature can be elevated to some extent in order to accelerate the reaction, as is well understood in the art.

The amount of the substituted hydroxybenzophenone compound employed can vary widely but is generally in the range from 0.01 to 10 weight percent of the epoxy resin starting material, while 0.1 to 5 weight percent is more usually employed. The amine curing agent is generally employed in an amount from about 6 to 10 weight percent of the epoxy resin starting material.

Specific examples of the starting material substituted orthohydroxybenzophenones include:

2-hydroxy-4,4'-methoxybenzophenone
2-hydroxy-4-methoxybenzophenone
2,4-hydroxybenzophenone
2,2'-hydroxy-4-methoxybenzophenone
2,2'-hydroxy-4,4'-methoxybenzophenone
2,2',4-hydroxy-4'-methoxybenzophenone
2,2',4,4'-hydroxybenzophenone
4'-butoxy-2-hydroxy-4-methoxybenzophenone
4,4'-diethoxy-2-hydroxybenzophenone
4'-ethoxy-2-hydroxy-4-methoxybenzophenone
4-ethoxy-2-hydroxybenzophenone
2,2'-hydroxy-4,4'-ethoxybenzophenone
2,2'-hydroxy-4,4'-propoxybenzophenone
2,2'-hydroxy-4-octoxybenzophenone
2,2'-hydroxy-4,4'-(isoamyloxy) benzophenone
2,2'-hydroxy-4,4'-hexoxybenzophenone
2,2'-hydroxy-4,4'-octoxybenzophenone Inert solvents can be employed in the reaction of the invention, and the use of such solvents or diluents is particularly useful in preparing films or coatings for surfaces of articles, such as glass containers. The amount of solvent is not important and can be employed in any quantity to obtain the desired working fluidity. The following examples are illustrative of, but are not to be taken as limiting, the invention.

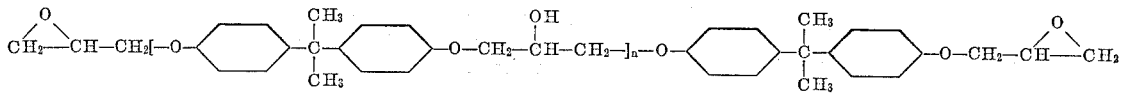

Example I

In this example, the absorber was mixed with the epoxy resin, the amine and the methyl ethyl ketone solvent and the mixture was allowed to react and cure to a solid. The formulation is given below.

| | Grams |
|---|---|
| Epoxy resin (Epon 834) | 10.00 |
| Diethylene triamine | 0.80 |
| Methyl ethyl ketone | 1.00 |
| Absorber | 0.54 |

In this example the absorber was 2,2'-hydroxy-4,4'-methoxy-benzophenone.

Example II

In this example, the procedure of Example I is repeated but the amount of the absorber is 1.00 g. and the amount of the methyl ethyl ketone is 1.50 g. Again, a solid cured resin is obtained.

A very important embodiment of the present invention is the coating of containers, particularly glass containers, in order to protect the contents against the effects of ultra-violet light. Flint bottles, for example, coated with the novel epoxy resin films of this invention not only screen out most of the ultra-violet light and transmit most of the visible light but have also been found to be resistant to abrasion. The runs of Example III illustrate the efficiency of the cured absorbent epoxy resin coatings of this invention in screening out the ultra-violet light.

Example III

In the following runs the formulation of Example I was employed except various benzophenone compounds were employed. In these runs the reaction mixtures were cast onto the flint glass as films and the coatings were cured thereon. Results are shown in Table I.

It is preferred that cured epoxy resin coatings of the invention have less than 30 percent transmission at a wave length of 400 millimicrons and substantially zero transmission at wave lengths of 380 millimicrons and lower when used in thicknesses of 1 mil with 5 percent of the benzophenone compound. It will be seen that the runs of this example containing the hydroxybenzophenone reacted with the amine fulfilled these criteria. Table I shows the results.

TABLE I.—TRANSMITTANCE OF EPON 834 CURED WITH DIETHYLENE TRIAMINE WITH 5% SUBSTITUTED HYDROXYBENZOPHENONE

[Film thickness corrected to 1 mil]

| Wave Length, Mu. | Base Glass Alone | Percent transmittance | | | | | |
|---|---|---|---|---|---|---|---|
| | | Absorber | | | | | |
| | | None | A | B | C | D | E | F |
| 300 | 16.5 | 14.3 | 0.0 | 0.0 | 0.0 | 0.0 | 0.0 | 0.0 |
| 320 | 59.5 | 54.3 | 0.0 | 0.0 | 0.0 | 0.0 | 0.0 | 0.0 |
| 340 | 89.4 | 80.0 | 0.0 | 0.0 | 0.0 | 0.0 | 0.0 | 0.0 |
| 360 | 91.0 | 87.6 | 0.0 | 0.0 | 0.0 | 0.0 | 0.0 | 0.0 |
| 380 | 90.8 | 89.0 | 0.0 | 0.0 | 0.0 | 0.0 | 0.0 | 0.0 |
| 400 | 91.9 | 90.5 | 0.0 | 0.0 | 24.3 | 0.0 | 3.5 | 0.0 |
| 420 | 91.6 | 90.9 | 36.8 | 20.3 | 70.6 | 0.0 | 13.0 | 0.0 |
| 440 | 91.6 | 91.0 | 73.4 | 60.4 | 86.0 | 50.7 | 59.6 | 63.2 |
| 460 | 91.6 | 90.7 | 87.5 | 81.5 | 88.0 | 82.9 | 84.0 | 85.0 |
| 480 | 91.6 | 90.9 | 89.0 | 84.3 | 88.5 | 89.5 | 88.7 | 88.5 |
| 500 | 91.6 | 90.7 | 89.0 | 84.7 | 88.6 | 90.5 | 89.8 | 89.0 |
| 520 | 91.6 | 90.7 | 89.2 | 85.2 | 88.9 | 90.5 | 90.0 | 89.5 |
| 540 | 91.6 | 90.9 | 89.2 | 85.4 | 89.1 | 90.6 | 90.0 | 89.5 |
| 560 | 91.6 | 90.9 | 89.3 | 85.7 | 89.3 | 90.6 | 90.2 | 89.8 |
| 580 | 91.6 | 90.9 | 89.3 | 86.0 | 89.6 | 90.7 | 90.4 | 89.8 |
| 600 | 91.6 | 90.9 | 89.3 | 86.2 | 89.6 | 90.7 | 90.4 | 90.0 |
| 620 | 91.6 | 90.9 | 89.3 | 86.3 | 89.6 | 90.7 | 90.4 | 90.0 |
| 640 | 91.6 | 90.9 | 89.3 | 86.3 | 89.6 | 90.7 | 90.4 | 90.0 |
| 660 | 91.6 | 91.0 | 89.3 | 86.5 | 90.0 | 90.7 | 90.5 | 90.0 |
| 680 | 91.6 | 91.0 | 89.6 | 86.7 | 90.0 | 91.2 | 90.5 | 90.0 |
| 700 | 91.6 | 91.0 | 89.6 | 86.7 | 90.0 | 91.2 | 90.5 | 90.4 |

A = 2-hydroxy-4,4'-methoxybenzophenone.
B = 2-hydroxy-4-methoxybenzophenone.
C = 2,4-hyrdoxybenzophenone.
D = 2,2'-hydroxy-4-methoxybenzophenone.
E = 2,2'-hydroxy-4,4'-methoxybenzophenone.
F = 20% 2,2'-hydroxy-4,4'-methoxybenzophenone.
80% {2,2',4-hydroxy-4'-methoxybenzophenone.
     {2,2',4,4'-hydroxybenzophenone.

While it is not definitely known whether the benzophenone compound reacts with the amine so as to chemically change the benzophenone compound, this is a distinct possibility since the ultra-violet absorption of the cured epoxy resin-aminebenzophenone mixtures is much higher than could be expected. This is brought out by a comparison of the following Table II data with the data in Table I. Table II shows results for films made as described with respect to Table I, except that the curing agent was citric acid instead of the amine. From these tables, it will be seen that the benzophenone compounds have a much greater effect in the amine cured films and that the unexpectedly greater absorption is not simply due to ultra-violet light absorption by the amine itself added to the absorption by the benzophenone compound.

TABLE II.—TRANSMITTANCE OF EPON 834 CURED WITH CITRIC ACID WITH 5% SUBSTITUTED HYDROXYBENZOPHENONE

[Film thickness corrected to 1 mil]

| Wave Length, Mu. | Base Glass Alone | Percent Transmittance | | | | |
|---|---|---|---|---|---|---|
| | | Absorber | | | | |
| | | None | B | C | D | F |
| 300 | 16.5 | 11.0 | 0.3 | 0.5 | 0.0 | 0.0 |
| 320 | 59.5 | 48.0 | 0.5 | 0.3 | 0.0 | 0.0 |
| 340 | 89.4 | 74.0 | 0.8 | 0.0 | 0.0 | 0.0 |
| 360 | 91.0 | 83.1 | 38.2 | 0.0 | 0.0 | 0.0 |
| 380 | 90.8 | 88.6 | 76.6 | 31.7 | 0.1 | 0.0 |
| 400 | 91.9 | 88.3 | 88.1 | 78.8 | 38.6 | 23.9 |
| 420 | 91.6 | 89.7 | 89.7 | 88.0 | 82.5 | 85.0 |
| 440 | 91.6 | 89.0 | 89.5 | 89.2 | 88.5 | 88.5 |
| 460 | 91.6 | 90.0 | 89.5 | 89.5 | 89.4 | 88.7 |
| 480 | 91.6 | 90.3 | 89.5 | 89.5 | 89.7 | 89.2 |
| 500 | 91.6 | 90.3 | 89.5 | 89.7 | 89.7 | 89.2 |
| 520 | 91.6 | 90.3 | 89.6 | 89.7 | 90.0 | 89.4 |
| 540 | 91.6 | 90.5 | 89.6 | 90.0 | 90.0 | 89.6 |
| 560 | 91.6 | 90.5 | 89.6 | 90.0 | 90.0 | 89.6 |
| 580 | 91.6 | 90.6 | 89.6 | 90.3 | 90.4 | 89.6 |
| 600 | 91.6 | 90.6 | 90.0 | 90.3 | 90.4 | 89.6 |
| 620 | 91.6 | 90.6 | 90.0 | 90.3 | 90.4 | 89.6 |
| 640 | 91.6 | 90.6 | 90.2 | 90.3 | 90.4 | 89.6 |
| 660 | 91.6 | 90.8 | 90.2 | 90.3 | 90.4 | 89.6 |
| 680 | 91.6 | 90.8 | 90.2 | 90.3 | 90.4 | 89.6 |
| 700 | 91.6 | 90.8 | 90.2 | 90.3 | 90.4 | 89.6 |

As will be evident to those skilled in the art, various modifications of this invention can be made or followed in the light of the foregoing disclosure and discussion without departing from the spirit and scope of the disclosure or from the scope of the claims.

We claim:

1. An ultraviolet light-absorbing reaction product of an epoxy resin with an organic amine curing agent for said epoxy resin in the presence of 0.01 to 10 weight percent of a hydroxybenzophenone based on the weight of said epoxy resin wherein said hydroxybenzophenone has the formula:

$$A-\underset{}{\bigcirc}-\underset{X}{\overset{}{C}}-\underset{\overset{\parallel}{O}}{\bigcirc}-D$$
$$\phantom{AAAAAAAA}OH$$

where

A is H, —OH, or —OR
X is H or —OH and
D is —OH or —OR where R is an alkyl group having from one to eight carbon atoms, the reaction being effected by intimately admixing said epoxy resin, said amine curing agent and said hydroxybenzophenone and allowing reaction to take place.

2. A product of claim 1 wherein said hydroxybenzophenone compound is employed in an amount in the range from 0.1 to 5 weight percent of the epoxy resin.

3. A container having as a coating thereon a product of claim 1.

4. A container of claim 3 wherein said container is made of glass.

5. A method of preparing an ultraviolet light-absorbing resin, which comprises mixing an epoxy resin, an amine curing agent for the epoxy resin, and a hydroxybenzophenone having the formula:

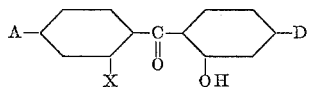

where

A is H, —OH, or —OR
X is H or —OH and
D is —OH or —OR and where R is an alkyl group having from 1–8 carbon atoms, wherein said amine reacts with the epoxy resin in the presence of the hydroxybenzophenone.

References Cited by the Examiner

UNITED STATES PATENTS

| | | | |
|---|---|---|---|
| 2,585,115 | 2/1952 | Greenlee | 260—47 |
| 2,706,189 | 4/1955 | Pruitt et al. | 260—45.95 |
| 2,871,219 | 1/1959 | Baggett et al. | 260—45.95 |
| 2,976,259 | 3/1961 | Hardy et al. | 260—591 |

FOREIGN PATENTS

| | | |
|---|---|---|
| 810,570 | 3/1959 | Great Britain. |
| 874,546 | 8/1961 | Great Britain. |

OTHER REFERENCES

Hackh's Chemical Dictionary, 3d Ed., McGraw-Hill Book Co., 1944, p. 310 relied on.

LEON J. BERCOVITZ, *Primary Examiner.*

HAROLD N. BURSTEIN, *Examiner.*